United States Patent [19]
Morin

[11] Patent Number: 5,570,774
[45] Date of Patent: Nov. 5, 1996

[54] COILED BLADE ASSEMBLY FOR BELT SCRAPER

[76] Inventor: Normand J. Morin, 143 A Gibson Street, Parry Sound ON, Canada, P2A 1Y1

[21] Appl. No.: 411,800
[22] PCT Filed: Oct. 15, 1993
[86] PCT No.: PCT/CA93/00419
§ 371 Date: Apr. 10, 1995
§ 102(e) Date: Apr. 10, 1995
[87] PCT Pub. No.: WO94/08876
PCT Pub. Date: Apr. 28, 1994

[30] Foreign Application Priority Data

Oct. 19, 1992 [GB] United Kingdom ............ 92/21902

[51] Int. Cl.$^6$ ........................ B65G 45/10; B65G 45/16
[52] U.S. Cl. ............................................ 198/499
[58] Field of Search .................... 198/499, 497

[56] References Cited

FOREIGN PATENT DOCUMENTS

| 582153 | 11/1977 | U.S.S.R. | 198/499 X |
| 1689241 | 11/1991 | U.S.S.R. | 198/499 X |
| 499041 | 6/1939 | United Kingdom . | |

*Primary Examiner*—William E. Terrell
*Assistant Examiner*—Dean A. Reichard
*Attorney, Agent, or Firm*—Anthony Asquith & Co.

[57] ABSTRACT

The polyurethane scraping blade for a conveyor belt scraper is wound into a spiral coil around a spindle. End plates attached to the spindle have inward-facing flanges, which catch the edges of the coil, thereby preventing the coil from unwinding inadvertently. Even though the flanges keep the main body of the coil from unwinding, the free end of the coil is easily drawn from between the flanges.

16 Claims, 4 Drawing Sheets

COILED BLADE ASSEMBLY FOR BELT SCRAPER

This invention relates to belt scrapers, being belt scrapers of the kind used to scrape caked material from conveyor belts.

BACKGROUND TO THE INVENTION

Conveyor belts are in common use in mines, for the transport of ore to and from crushing, milling, and comminuting machines. Dust and fine particles of crushed ore can become caked very firmly indeed to the belt, especially if moisture is present.

Scraping caked material from mine conveyor belts is well-known to be a most demanding task. The task is usually approached on the basis of pressing a scraper blade against the (moving) face of the belt. The scraper blade gradually wears down under the abrasive conditions, and one of the problems of belt-scraping lies in providing a scraper blade of sufficient length that the blade has a long service life between replacements.

The conventional approach to the problem that the blade has only a short life is to press the blade against the belt with less force. The invention is aimed at providing an economical scraper in which the blade has a long service life, yet in which the blade is pressed against the belt with sufficient force for excellent scraping.

U.S. patent publication no U.S. Pat. No. 5,048,667 (MORIN, 17-Sep.-91) shows a scraper assembly in which the scraper blade is of flexible plastic material, which is rolled into a coil. This arrangement has led to a scraper assembly in which the scraper blade need only be changed on, say, an annual basis, as against the every-six-weeks replacement which has tended to be the industry standard in the most demanding situations.

One of the problems that has arisen in regard to these coiled-blade scraper assemblies is that the blade can tend to stick or "freeze" to the inside of the blade housing. As is shown in '667, the coiled blade is contained inside a cylindrical housing. The inherent stiffness of the blade material means that the blade tends to try to unroll itself within the housing; in fact, the blade tends to uncoil itself until the material of the blade lies in direct touching contact with the inside of the housing.

Once the blade has unrolled itself as much as it can inside the housing, the friction of the blade material against the inside of the housing builds up, and this friction can make it difficult for the blade to move and rotate within the housing.

If the blade is allowed to unroll inside the housing, ie if the blade is allowed to unroll itself and make frictional contact against the inside wall of the housing, the force required to drive the blade out of the housing therefore increases; not only is the need for the increased force a disadvantage, but another disadvantage is that some of the controllability of the pressure of the blade against the belt is lost.

It may be noted that the friction is caused by the tendency of the belt to uncoil itself, rather than by the pressure forcing the blade against the belt.

In the said patent '667, the blade is driven out of the housing and against the belt by means of fluid pressure inside the housing. One benefit of this system is that the reaction to the belt contact force is not supported by direct touching contact between the coil and the housing, which eliminates a source of what would be a considerable friction. However, the material of a scraper blade, even though able to be wound into a coil, nevertheless is characterized as being very stiff and intractable; where the material does touch the housing as a result of its trying to uncoil itself, the friction arising from that contact can be considerable.

Thus, in '667, the blade is forced out of the housing in such a manner that the actuation force on the blade does not give rise to a frictional resistance proportional thereto: the friction that arises simply due to the tendency of the blade to uncoil itself inside the housing, is the problem with which the invention is concerned. The problem exists because the coil of blade material tends to unwind itself until it comes into contact with the housing, or with whatever is present that prevents it unwinding further.

The present invention is aimed at providing a scraper assembly of the coiled-blade type, in which friction associated with contact between the coiled blade and the blade housing is much less than has been the case in the previous scraper assemblies.

Another aim of the invention is to provide a scraper assembly in which replacement of the coiled blade is made more simple, by the fact that the replacement blade can be assembled in the factory into a coiled-up state, and can remain so during insertion of the new blade into the housing, whereby the service technician does not have to coil up the blade during or after assembly of the blade into the housing.

It is an aim of the invention to keep the blade material coiled tightly enough that the coil cannot "escape" and start to touch the inside of the housing. On the other hand, it is an aim of the invention that the force required to draw the free end of the blade out of the coil should be a light force, and that the force should be as light when the coil is new as when the coil is almost worn away.

It is an aim of the invention to keep the coil of blade material constrained against expansion without resorting to applying torque to the coil. It would be theoretically possible, for example, to keep a coil tight by applying a torque to a spindle to which the inner end of the spiral coil is attached. However, it is preferred that the coil be kept under constraint by means which do not require a torque to be exerted between the coil and the housing: such a torque requirement, if present, would greatly interfere with the freedom of choice of the designer to design an adequate actuator means for pressing the blade against the belt.

It will be understood that if the constraint against unrolling were to take the form of a cage of some kind, placed so as to encircle the coil, the coil would simply unroll itself as much as possible within the cage. The friction of the partially unrolled coil against the cage then would be hardly any less damaging than the friction of the partially unrolled coil against the housing. Therefore, the means for constraining the coil against unrolling cannot, in practice, take the form of a coil-encircling cage.

It might be considered that it would be possible to position suitable means on the walls of the housing to hold the coil away from the walls, and to thereby stop the coil expanding. However, to avoid installation difficulties, it is best for the coil containment constraints to be provided, not by or from the housing, but in the coil assembly itself, ie in the assembly that is installed with the blade.

PRIOR ART

Apart from the above mentioned U.S. Pat. No. 5,048,667, coiled scraper blades are shown also in:

U.S. Pat. No. 4,877,122 (MORIN, 31-Oct.-1989)
U.S. Pat. No. 2,545,882 (HALL, 20-Mar.-1951)
FR-1378871 (MICHELIN, 12-Oct.-1964)
DE-AS-1051725 (ESCH-WK, 26-Feb.-1959).

GENERAL FEATURES OF THE INVENTION

The invention provides a means whereby the force with which a coiled scaper blade is pressed against the conveyor belt is rendered smoothly controllable. The invention provides a means for constraining the coil against unwinding, and consequent expansion and contact with the scraper housing or other structure surrounding the coil.

Preferably, the means for constraining the coil against expansion is effective to provide the constraint throughout the service life of the blade.

Preferably, the coiled blade assembly includes a spindle and two end plates, the coil being located between the end plates. The end plates are provided with axially-inwardly-extending, opposed flanges. The flanges prevent the edges of the coil from unwinding and expanding.

It is recognised that because the blade is coiled into a tight cylinder, it is sufficient just to provide constraint at the very ends of the coil. The wrapped coil is rigid enough that the middle part of the coil, though it might bow out slightly, will not bow out so much that the coil would fall clear of the flanges.

It is recognised that the flanges therefore can be axially short. There is no need in fact for the anti-unwinding constraints to extend across the full width of the blade. The fact that the blade is coiled into a cylinder, and the fact that a coiled cylinder becomes a very rigid structure, means that constraints placed only at the edges of the coil will serve adequately. It is recognised that the flanges can be short enough indeed that the free end of the blade can simply be pulled out from between the flanges.

Thus, the invention provides for just a light force to pull the free end of the blade out of the coil, and yet provides a very strong constraint to hold in the coil against its tendency to unwind.

BRIEF DESCRIPTION OF THE DRAWINGS

By way of further explanation of the invention, exemplary embodiments of the invention will now be described with reference to the accompanying drawings, in which.

DETAILED DESCRIPTION OF THE PREFERRED EMBODIMENTS

The items shown in the accompanying drawings and described below are examples which embody the invention. It should be noted that the scope of the invention is defined by the accompanying claims, and not necessarily by specific features of exemplary embodiments.

Figure 1:
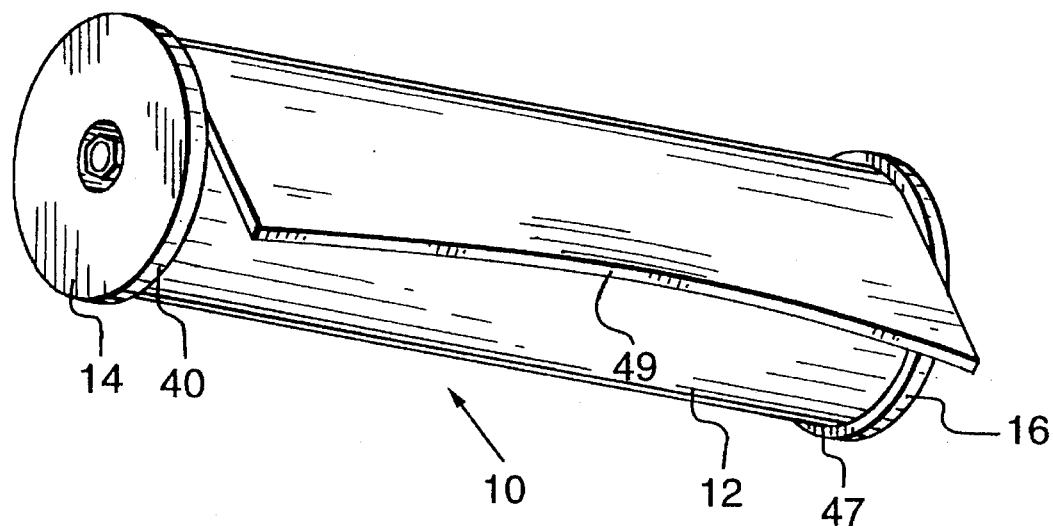
FIG. 1 is a pictorial view of a coiled scraper blade assembly, for a belt scraper.

The scraper blade coil assembly 10 shown in FIG. 1 includes a length 12 of scraper blade. The material of the blade is a hard polyurethane plastic, or other suitable material. The blade material is typically 8 mm thick, and may be, in a typical case, 120 cm wide. The width of the blade (ie the dimension measured along the axis of the coil) is set to be a little less than the width of the belt it is to scrape. (The blade should be the same width as the belt except for a margin of tolerance to ensure the edges of the blade cannot overhang the edges of the belt.) The length of the blade, ie the dimension which is to be coiled, in a typical case may be two or three meters.

Such a blade is flexible, in that it is possible to bend the material into a coil. However, the force required to bend the material is considerable; it will be understood that such a blade is flexible enough that the blade might be bent by hand, but the blade is so stiff as to make the coiling of the blade, and the retention of the curvature therein, a task which cannot, in practice, be done manually.

The blade 12 is gripped between two end plates 14, 16. A spindle 18 connects the end plates.

Figure 2:
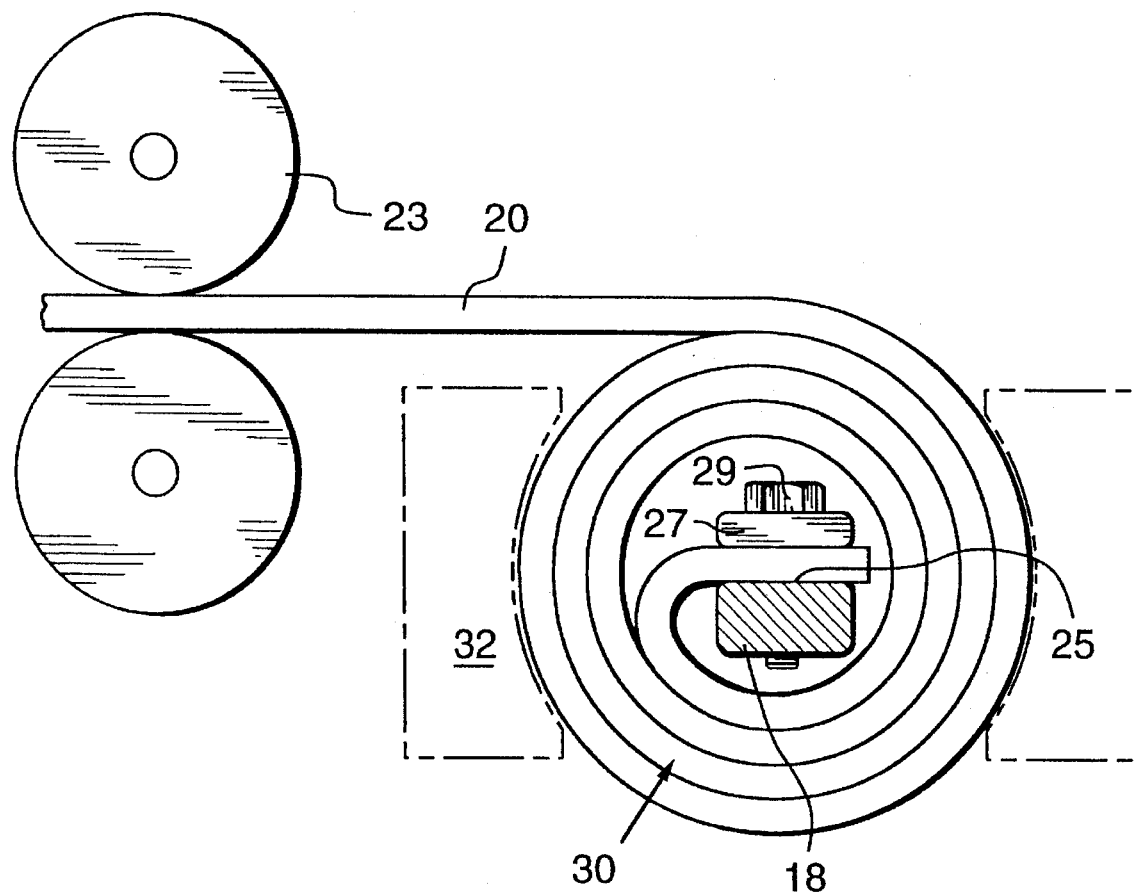
FIG. 2 is a diagram of a factory set-up for coiling the scraper blade.

FIG. 2 illustrates the manner in which the blade is coiled. In the factory (ie not at the scraper site), belt material 20 is fed through a pair of pinch rollers 23. The spindle 18 is mounted in suitable bearings, and the free end of the belt material is clamped between a clamp face 25 of the spindle and a clamp bar 27. Clamp bolts 29 pass though the clamp bar 27 and through holes in the blade material 20.

In the factory where the coil assemblies are prepared, the spindle 18 is so mounted in the bearings that the spindle may be forcefully rotated, whereby the belt 20 is drawn through the pinch rollers 23, and becomes coiled around the spindle. The pinch rollers are set to resist pull-through forces, to the extent that the tightness of the coil 30 of the belt material is controlled by the resistance to rotation of the rollers 23.

After the required length of material has been wound into the coil 30, steps are taken to ensure that the coil cannot now unwind itself. (The tendency of the coil to unwind itself is inherently present at all times.) This might be done for example by maintaining a torque on the spindle 18, and locking the rollers 23, or it might be done by placing restraints 32 around the circumference of the coil 30.

Now, with the coil restrained against unwinding, the end plates 14, 16 are tightened onto the ends of the spindle 18. The end plates are tightened (in the axial direction) towards the edges of the blade material 20 coiled about the spindle. The application of the end plates onto the spindle is made easier if the ends of the spindle are free, ie if the spindle has been removed from any torque applicators or bearings in which it was mounted during coiling.

With the end plates 14, 16 in place, the blade material 20 is cut to length. The restraints 32 may now be removed, and the assembly is ready for operational use. The end plates serve to keep the coil from unwinding, as will explained below. For storage and handling prior to use, a band may be placed circumferentially around the coil to prevent unwinding in case of accidents.

The end plates 14, 16 are tightened against shoulders 34 provided on the spindle 18. Studs 38 extend outwards from the spindle, and pass through a suitable through-drilling in the centre of the end plate. Each end plate is secured in place over the respective stud by means of a nut 39.

Means are provided for preventing the end plates 14, 16 separating from each other, and from moving axially outwards with respect to the spindle 18. To inhibit the nut 39 from working loose, the designer may arrange that each end plate is secured against rotation relative to the spindle, for example by means of a tongue on the hub of the spindle, which engages a suitable groove on the shoulder 34. Or, the designer may arrange that the nuts are locked to the studs.

Figure 3:
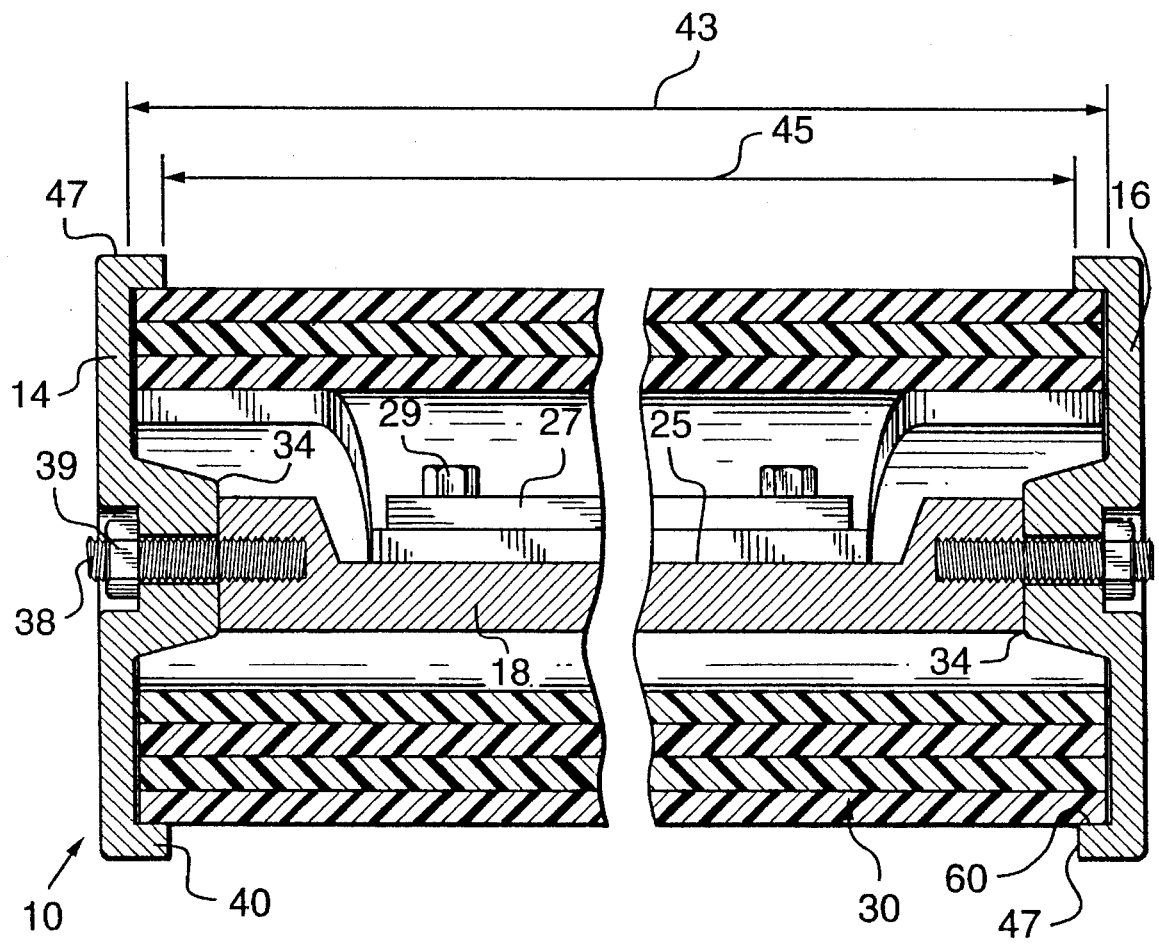
FIG. 3 is a front elevation, in cross-section, of the assembly of FIG. 1.

The designer may choose to make the end plates free to rotate on the spindle, or may choose to secure the end plates against rotation. In FIG. 3, the end plates are secured against moving axially relative to the spindle, and are secured against rotation.

The end plates are provided with respective opposing flanges 40, which protrude axially inwardly. As shown in FIG. 3, the axial width 43 of the blade material is greater than the distance apart 45 of the inward-facing surfaces 47 of the flanges 40.

It will be appreciated that, in order for the material to pass between the flanges, the material must be curled in the manner as shown in FIG. 1 in relation to the free end 49 of the blade.

Apart from the flanges 40, the rest of the end plates need not be so tight on the blade material as to compress the material, although a slight pinch can be accommodated. The designer must see to it that the end plates are so shaped and mounted that the blade material cannot escape from between the flanges; if the end plates were allowed to separate, the coil would cease to be constrained by the flanges, and would uncoil itself.

In the assembly as shown, the cylindrical coil of blade material is contained between the end plates, and is restrained from expansion beyond a predetermined diameter by the presence of the flanges 40. The coil may be expected to uncoil and expand itself fully to the extent permitted by the flanges.

Figure 4:
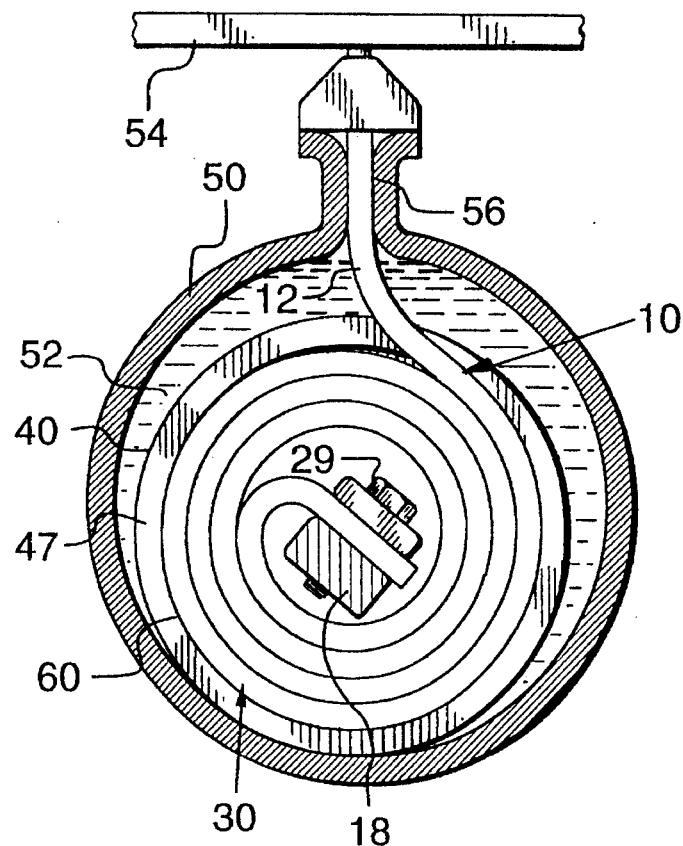
FIG. 4 is an end elevation, in cross-section, of a belt scraper, in which the assembly of FIG. 1 is mounted for operational use.

FIG. 4 shows the scraper blade assembly 10 fitted inside the housing 50 of a belt scraper. The housing is supplied with a fluid (eg water) which pressurises the interior chamber 52 inside the housing, and urges the blade out of the housing, and into contact with the moving belt 54 which is to be scraped. The blade passes out of a slot 56 in the housing 50, in which the blade is sealed to the housing by means of an elastomeric seal. In some designs of scraper, the chamber 52 is pressurised all the time during operation of the scraper; in other designs, the housing is pressurised only intermittently during operation. In still other designs, the chamber is not pressurised, but rather the coiled blade is forced out of the housing by a different type of means, for example by the use of mechanically biassed grip-rollers.

The housing 50 is basically cylindrical in shape, and is fitted with a detachable end cover (not shown), through which the blade assembly 10 can be inserted. The service technician removes from the assembly 10 the transport safety band, if fitted, just prior to inserting the assembly into the housing. The technician feeds the free end 49 of the coiled blade up through the slot 56.

There is no connection between the coil assembly 10 and the housing 50 other than at the sealed slot 56. There is no requirement for the spindle 18 to be physically attached to the end cover of the housing, for instance. The assembly 10 simply rests inside the chamber 52.

As the blade material 12 is drawn from the coil 30, the coil rotates inside the housing 50. Thus if the coil includes say eight turns of blade material, the coil, and the spindle 18, end plates 14, 16, etc, undergo eight rotations within the housing during the service life of the blade. (Actually, the number of rotations of the spindle would be less than that, because the coil continually unwinds to the maximum diameter as the blade is drawn off.) As mentioned, the coil assembly simply rests inside the housing: no bearings or the like are required to cater for this rotation.

It will be understood that there is no need for the technician, when fitting the coil assembly into the housing, to apply forces to the assembly by way of coiling up the blade. The only force the technician is required to exert is that of lifting the assembly into place. Inevitably, because of restricted access, this lifting will have to be carried out by physically manhandling the assembly. But the assembly 10 is light in weight: the plastic blade material is not heavy, and the spindle, end plates, and other components can be made of aluminum in the bigger sizes of scraper where weight might start to be a problem. Alternatively, the flange may be a plastic moulding, and the spindle components may be of stainless steel. For removing a worn out blade, of course only a short length of the blade material will still be present.

As mentioned, the blade material 12, though rolled into the coil as described, is stiff, and must be kept under tight control to prevent its unrolling. If the coil is allowed to unroll itself, the blade material will contact the inside of the housing 50, and may "freeze" to the housing. Whilst the coil can be permitted to unwind to some extent, the coil must be constrained against unwinding itself so much that the coil fills the width of the chamber.

In the design as shown, the blade material is wider, as at 43, than the distance apart 45 of the flanges 40. In the housing 50, during operation, the coil 30 expands, ie unwinds itself, until the axial ends of the blade material contact the radially-inside-facing surfaces 60 of the flanges. The only way for the blade material to be released from between the flanges is if the free end 49 of the blade is buckled slightly to a curve, as shown in FIG. 1. When this happens, the blade can be withdrawn from between the flanged end plates. In fact, when the free end is allowed to buckle in this manner, the free end can be drawn from the coil with little force.

It might be considered that, if it is indeed easy for the blade material to buckle, and pass between the flanged end-plates, that the blade might simply buckle all at once, and thus fall out from between the end plates. The answer lies in the different curvatures of the blade. At the free end of the blade material, the material can buckle because the curvature of the blade about an axis lying parallel to the axis of the spindle is practically zero once the blade has left the coil. But in the main body of the coil, the blade material is tightly curved to a cylindrical radius about the spindle axis. It requires little force to make the blade material buckle once the blade material has left the coil: it would take a huge increase in force to make the blade material buckle while the blade material is still in the coil, and still curved into a tight cylinder.

Thus, in the main body of the coil 30, the blade material remains right-cylindrical. As explained, the coil has a large inherent tendency to uncoil itself as much as it can within the confines of the flanged end plates 14,16; but the coil displays very little tendency to bulge and buckle, in the central portion of the coil, between the end plates. This is not to say that the cylinder of the coil remains perfectly parallel-edged: certainly the cylinder of the coil will go slightly barrel-shaped, especially if the blade is wide. But it is recognised that there is only a tiny chance (it cannot be said there is no possibility whatsoever) of the coil bowing or barrelling out in the middle to such an extent that the coil could free itself of the flanged end plates.

Even though the main body of the coil is firmly held by the geometry of its cylindrically-coiled curvature, the fact is that once the blade passes out of the coil, and the coil-curvature disappears, the blade buckles quite easily. Therefore, the force required to pull the free end 49 of the blade material out from between the end plates is really quite small. Furthermore, the force required to pull the blade clear, remains more or less constant throughout the whole length of the coil, ie the force required to pull the free end of the blade out from between the end plates is the same whether the blade is new and unworn, or whether only a few cm of blade material remain.

It may be considered that the edges of the blade might be damaged by being dragged through the flanges. However, no difficulties arise here: firstly, if the edges of the blade were damaged it would not matter because the edges of the belt are usually the least demanding as regards scraping; but in any event it turns out that virtually no chewing-up of the edges of the blade can be perceived.

The performance of the device as illustrated may be summarised as follows. A flexible material, when formed into a relatively tight cylindrical coil, greatly resists barrelling. However, once the material is clear of the cylindrical coil, the material can buckle into the kind of curve shown in FIG. 1 with little resistance. In the assembly as shown, the coil unwinds itself progressively as more blade material is drawn off, so that the coil is always tight against the insides 60 of the flanges. But the blade material can be pulled clear of the flanges with only a light force, which remains light even when the coil is (almost) completely unwound.

In fact, as the blade material becomes nearly completely worn away, the problem of the blade material coil expanding and freezing against the housing walls tends to disappear. It is only when the coil includes enough material to form at least one area of overlap between adjacent turns of the coil that the problem of the coil freezing to the housing is substantial. Another preferred manner in which the scraper blade material may be wound into a coil will now be described.

In the previously described design (FIGS. 1–4), the blade is wound into a coil as a factory operation; the coiled blade, as shown in FIG. 1, constitutes the product that is made in the factory and sold as a replacement blade (or indeed as an Original Equipment blade). To fit the replacement blade, the user opens up the axial ends of the housing, and inserts the already-coiled "cassette" (ie the assembly shown in FIG. 1) into the housing. The technician then manoeuvres the free end of the blade out through the slot 56.

In some cases, there can be a difficulty in registering the free end of the blade with the slot 56 from the inside, especially since there is no room for the technician to pass his hands into or inside the housing 50 when the coil 30 is present in the housing.

Figure 5:
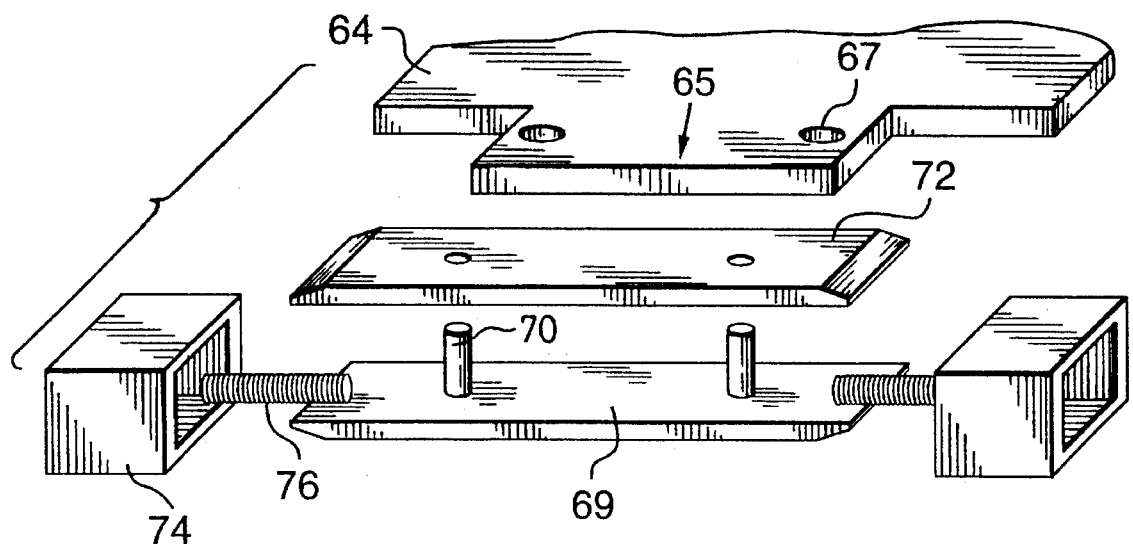
FIG. 5 is a pictorial view of another coiled scraper blade assembly.
Figure 6:
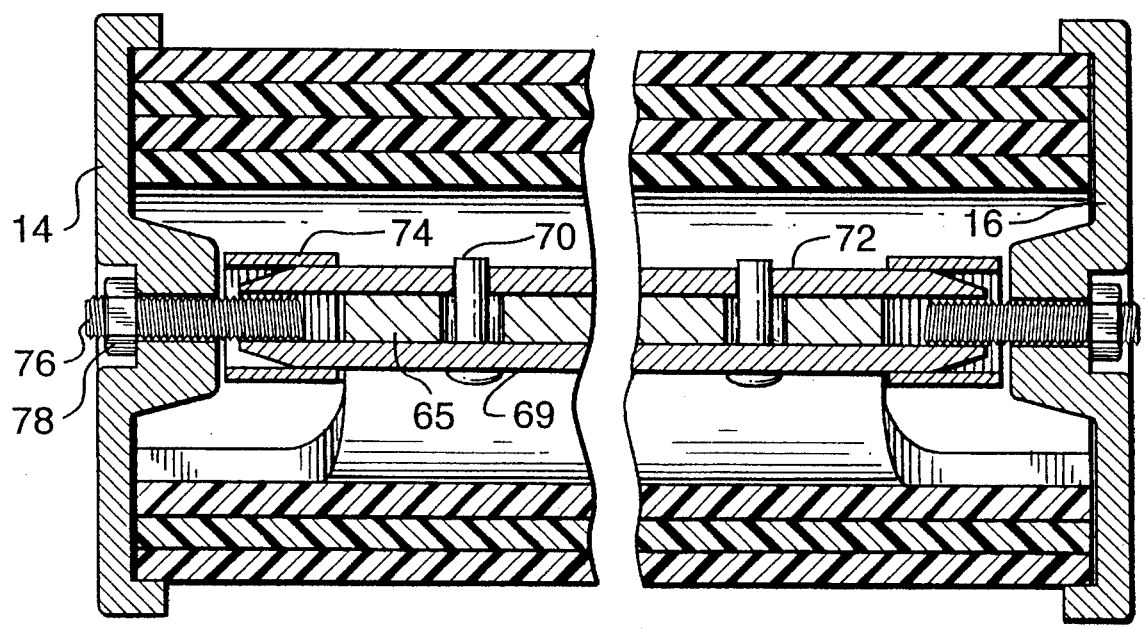
FIG. 6 is a front elevation of the assembly of FIG. 5.

It is often preferred therefore to insert a replacement blade from outside the housing. FIGS. 5–6 illustrate a system in which this preference is accommodated.

In FIG. 5, the blade 64 is formed on what will be the inner end of the coil of the blade material, with a tongue 65. The tongue 65 has two slotted holes 67. A spindle piece 69 is provided with two pegs 70, which engage the holes 67.

It will be understood that the task of attaching the tongue to the spindle piece is carried out from inside the housing 50. The tongue 65 is inserted through the slot 56 from outside the housing, while the length of the blade 64 is disposed outside the housing, and then the spindle piece is assembled to the tongue 65.

With the tongue 65 assembled to the spindle piece 69, a backing piece 72 is fitted also over the pegs 70. Then, square tubular sleeves 74 are placed over the ends of the spindle piece and the backing piece. The ends of these pieces are chamfered, to enable the sleeves to slide easily onto the pieces. It will be noted that these operations can easily be carried out, by hand, by the technician working with his hands inside the housing. No tools are required, and no heavy forces need be exerted.

With the sleeves 74 in place, screwed rods 76, which are integral with the spindle piece 69, protrude axially from inside the sleeves. The technician now places one of the end plates 14 over one of the screwed rods 76, and tightens the end plate in place with a nut 78. The technician carries out this task with the assistance of a wrench or spanner of suitable form.

The technician now continues to turn the nut 78, thereby rotating the spindle 69. This action coils the blade material 64 around the spindle 69. The technician continues to rotate the spindle until all the length of the blade 64 is coiled around the spindle, except for a small margin of the blade, which he leaves still protruding out of the slot in the housing. The technician places a clamp on this protruding margin, to prevent it from being drawn in through the slot, and then he may tighten and straighten the coil, and position the coil correctly in the housing. The technician also at this time places the other end cap 16 onto the other of the screwed rods 76, and assembles a nut to hold same in place.

The technician tightens the nuts, drawing the two flanges together, until the coil is positioned (axially) centrally between the two end caps. The holes 67, being slotted, permit a certain degree of axial shuffling of the coil along the spindle. The end plates are not tightened onto the ends of the coil so as to compress the coil, but only so as to lightly touch the ends of the coil. When the nuts 78 are correctly tightened, locknuts may be placed on the screwed rods 76 to prevent backing off.

The above-described operations on the nuts can be carried out with the coil components residing inside the housing, since the only access required is to the nuts and the screwed rods.

The system described with reference to FIGS. 1–4 provides a pre-coiled blade assembly, which is fitted as a cassette into the housing. The outer end of the coil is fed through the slot in the housing from the inside. In the FIG. 5–6 system, by contrast, the replacement blade is coiled into the housing by an on-site technician, who inserts a tongue of the blade into the housing from outside. In FIGS. 5–6, the extra inconvenience of having to carry out the on-site operations of attaching the blade to the spindle, and of having to coil the blade around the spindle, is offset by the extra convenience that arises from inserting the new blade from outside.

One of the difficulties facing the designer of the assemblies as described herein is the fact that the polyurethane as used for the blade material has a high coefficient of thermal expansion. If the scraper is to be installed in a place which suffers extremes of temperature, the blade material can undergo a dimensional change, across the width of the coil, of 3 or 4 mm, from cold winter nights to hot summer sun.

The designer must see to it that the blade does not contract during cold weather so much that the blade material pops out from between the flanges on the end-plates.

In FIG. 3, the end-plates 14, 16 are tightened against shoulders 34 on the spindle 18. This arrangement does not practically allow for contraction. In FIG. 6, the end plates are tightened against the coil of blade material; in this arrangement, the coil can be compressed axially between the end-plates. The designer then can specify that 3 mm or other appropriate amount of pre-compression be built in (when the components are assembled at room temperature) that even the coldest temperature will not cause sufficient contraction that the coil breaks contact with the end plates.

Figure 7:
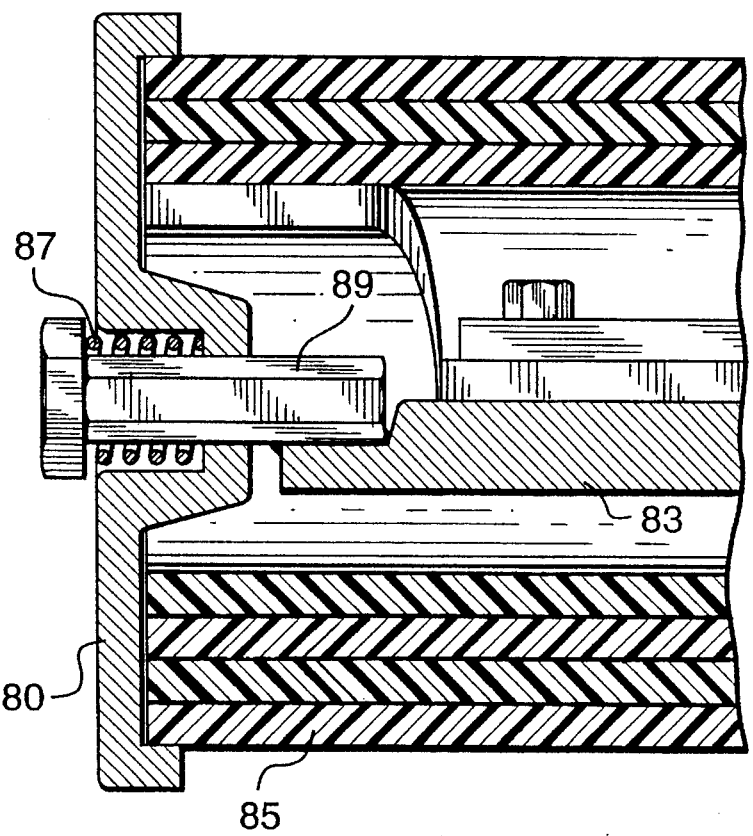
FIG. 7 is a front elevation, in cross-section, of yet another coiled scraper blade assembly.

In FIG. 7, the end-plates 80 are slidable along the spindle 83. The end-plates are forced into contact with the ends of the coil 85 by means of springs 87. If the coil should expand/contract axially, the end-plates can follow the movement, and the springs 87 keep the contact force more or less constant.

It is usually convenient to arrange that the end-plates cannot rotate relative to the spindle. To this end, an extension component 89 of the spindle is of hexagonal shape, and the end-plates are provided with complementary hexagonal holes, whereby the end-plate can slide along the spindle, but cannot rotate relative thereto.

I claim:

1. Coiled blade assembly for a conveyer belt scraper, characterised in that:
   the assembly includes a blade (20) of scraper material, the blade being suitable for pressing against the belt, and for scraping and cleaning the belt;
   in the assembly, the blade material is arranged in a spiral coil (30) of more than one turn, about a coil axis, the coil having left and right axial ends;
   the assembly includes left and right coil-constrainers (14,16), which are arranged so as to constrain the coil against radial expansion;
   the assembly includes structure (18) for holding the left and right coil-constrainers in position at, or near, the respective axial ends of the coil;
   the coil-constrainers extend a distance in from the ends of the coil;
   the distance is long enough that the coil is substantially firmly constrained by the coil-constrainers against radial expansion, at least during operation of the scraper;
   the distance is short enough that, during operation of the scraper, an outer end (49) of the blade material forming the coil can be drawn smoothly and freely from the coil, between the coil-constrainers.

2. Assembly of claim 1, wherein the left and right coil-constrainers respectively comprise left and right rings that encircle the coil at, or near, the ends thereof.

3. Assembly of claim 1, wherein the structure for holding the left and right coil-constrainers in position comprises a means which is effective, if the coil should tend to thermally expand/contract as to its axial dimension during operation, still to hold the coil-constrainers in position at, or near, the respective axial ends of the coil during that expansion/contraction.

4. Assembly of claim 1, wherein:
   the assembly includes left and right end-plates, positioned respectively at the left and right ends of the coil;
   the coil-constrainers comprise axially-inwardly-extending flanges of the end-plates.

5. Assembly of claim 4, wherein the assembly includes structure for holding the left and right end-plates against the respective ends of the coil.

6. Assembly of claim 5, wherein the structure for holding the left and right end-plates against the ends of the coil is effective, during operation, to constrain the end-plates against relative separation thereof, in the axial sense.

7. Assembly of claim 6, wherein the structure for holding the left and right end-plates against the respective ends of the coil is arranged, prior to operation, to pre-compress the coil in an axial sense by an amount, where the amount is more than the axial thermal contraction of the coil occasioned by a reduction in temperature of the assembly during operation.

8. Assembly of claim 5, wherein the structure for holding the left-and right end-plates against the respective ends of the coil is effective to permit the end-plates to move axially relative to each other, and thereby to follow such thermal expansion/contraction movement of the coil as may occur in the axial sense during operation.

9. Assembly of claim 8, wherein the structure for holding the left and right end-plates against the respective ends of the coil includes a resilient means, which is effective to keep the force of the end-plates against the ends of the coil substantially constant as the end-plates undergo such movement.

10. Assembly of claim 4, wherein the end-plates are locked against rotation relative to the spindle, whereby, as the coil rotates and unwinds, the coil, spindle, and end-plates rotate as a unitary whole.

11. Assembly of claim 1, wherein the distance is about 3 mm.

12. Assembly of claim 1, wherein the coil-constrainers are effective to constrain the coil against expansion during transport and storage of the coil, away from the belt.

13. Coiled blade assembly for a conveyor belt scraper, in structural combination with a housing of the said scraper, characterised in that:
   the conveyor belt scraper is of the kind in which the coiled blade assembly is, during operation of the scraper, housed in an interior chamber of the housing (50), walls of the chamber defining an internal clear space of sufficient diametral width to accommodate the assembly;
   the assembly includes a blade of scraper material, the blade being suitable for pressing against the belt, and for scraping and cleaning the belt;
   the combination includes a mounting means, on which the blade is mounted, and on which the blade is arranged in a spiral coil of more than one turn, about a coil axis;
   the arrangement of the assembly is such that, when the assembly is present in the housing, a free end of the coiled blade is available to pass out through the housing and into scraping contact with the belt;
   the combination includes a coil constraining means, which is effective, during operation of the scraper, to prevent the coil from unwinding and expanding in width beyond a predetermined diametral constraint width;
   and the said predetermined diametral width to which the coil is constrained is less than the diametral width of the housing chamber, whereby the coil is constrained against unwinding and expanding into contact with the walls of the chamber.

14. Combination of claim 13, wherein the arrangement of the coil constraining means is such that the means is effective to so prevent the coil from unwinding beyond the said constraint width substantially throughout the whole operational service life of the blade.

15. Combination of claim 13, wherein the coil constraining means is integral with the assembly, in that the means is effective to so prevent the coil from unwinding both when the assembly is physically separate from the housing, and when the assembly is present inside the housing.

16. Assembly of claim 5, wherein the said structure extends inside the coil along its axis.

* * * * *